(12) United States Patent
McClure

(10) Patent No.: US 9,493,947 B2
(45) Date of Patent: Nov. 15, 2016

(54) WALL INSULATION SYSTEMS AND STANCHION

(76) Inventor: Richard R. McClure, Basehor, KS (US)

( * ) Notice: Subject to any disclaimer, the term of this patent is extended or adjusted under 35 U.S.C. 154(b) by 0 days.

(21) Appl. No.: 14/009,469

(22) PCT Filed: Mar. 9, 2012

(86) PCT No.: PCT/US2012/028582
§ 371 (c)(1),
(2), (4) Date: Dec. 16, 2013

(87) PCT Pub. No.: WO2012/138449
PCT Pub. Date: Oct. 11, 2012

(65) Prior Publication Data
US 2014/0083037 A1    Mar. 27, 2014

Related U.S. Application Data

(60) Provisional application No. 61/472,400, filed on Apr. 6, 2011.

(51) Int. Cl.
| | | |
|---|---|---|
| *E04B 2/00* | (2006.01) | |
| *E04B 1/76* | (2006.01) | |
| *E04F 13/08* | (2006.01) | |
| *E04F 13/12* | (2006.01) | |

(52) U.S. Cl.
CPC ............... *E04C 2/46* (2013.01); *E04B 1/7629* (2013.01); *E04B 1/7654* (2013.01); *E04B 1/7662* (2013.01); *E04B 1/7675* (2013.01); *E04F 13/0817* (2013.01); *E04F 13/12* (2013.01); *E04B 2001/7679* (2013.01); *Y02B 30/94* (2013.01)

(58) Field of Classification Search
CPC ............ E04D 13/1618; E04D 3/3602; E04D 3/3607; E04B 1/762; E04B 1/7662; E04B 1/7666; E04B 2/58; E04B 9/363; E04B 1/7629; E04B 1/7637; E04B 1/7654
USPC .............. 52/407.2, 407.3, 407.4, 512, 404.1, 52/478, 483.1, 742.1, 742.12, 404.2, 52/404.3, 309.16, 481.1, 506.05, 506.06, 52/543, 552, 553
See application file for complete search history.

(56) References Cited

U.S. PATENT DOCUMENTS

| | | | | |
|---|---|---|---|---|
| 2,459,415 A | * | 1/1949 | Cibulka | E04B 2/58 |
| | | | | 52/11 |
| 3,662,509 A | * | 5/1972 | Studzinski | 52/404.1 |
| 4,081,938 A | * | 4/1978 | Bertacchi et al. | 52/410 |
| 4,114,338 A | * | 9/1978 | Beck | E04D 3/365 |
| | | | | 52/478 |

(Continued)

FOREIGN PATENT DOCUMENTS

EP    0011202 A1    5/1980

OTHER PUBLICATIONS

PCT Patent Application PCT/US2012/028582 International Search Report and Written Opinion dated Jul. 30, 2012, 10 pages.

(Continued)

*Primary Examiner* — Robert Canfield
*Assistant Examiner* — Matthew Gitlin

(57) ABSTRACT

Disclosed is a wall system and a method of fabricating that wall. The system uses a stanchion, or bracket. The bracket is installed between the outer flanges of the structural girts that make up the wall and a wall panel. The tabs create space between the girt and panel that enables insulation to be spread out into the additional space created. This reduces heat losses in the wall.

10 Claims, 6 Drawing Sheets

(56) References Cited

U.S. PATENT DOCUMENTS

| | | | |
|---|---|---|---|
| 4,248,021 A * | 2/1981 | Dyer | 52/404.1 |
| 4,275,541 A * | 6/1981 | Orals | E04B 5/10 |
| | | | 411/412 |
| 4,314,428 A | 2/1982 | Bromwell | |
| 4,346,543 A * | 8/1982 | Wilson | E04D 3/3602 |
| | | | 52/404.2 |
| 4,538,391 A * | 9/1985 | Skrabis | E04B 1/762 |
| | | | 52/478 |
| 4,571,909 A * | 2/1986 | Berghuis | E04B 1/76 |
| | | | 52/309.11 |
| 4,651,489 A * | 3/1987 | Hodges | E04D 3/3602 |
| | | | 52/409 |
| 4,682,454 A | 7/1987 | Simpson et al. | |
| 4,747,249 A * | 5/1988 | Bell, III | E04D 3/3602 |
| | | | 52/404.1 |
| 4,791,770 A * | 12/1988 | Bell, III | E04D 3/3602 |
| | | | 52/428 |
| 5,367,848 A * | 11/1994 | McConnohie | 52/336 |
| 5,561,959 A * | 10/1996 | Alderman | E04D 15/06 |
| | | | 52/404.1 |
| 5,842,316 A * | 12/1998 | Keiper | E04D 3/3605 |
| | | | 52/309.11 |
| 6,085,485 A | 7/2000 | Murdock | 52/783.19 |
| 6,393,797 B1 * | 5/2002 | Romes | 52/746.1 |
| 7,174,686 B1 * | 2/2007 | Legband | 52/471 |
| 8,181,410 B2 * | 5/2012 | Stensrud | E04H 5/10 |
| | | | 52/404.1 |
| 8,615,946 B2 * | 12/2013 | Oberg | E04B 2/58 |
| | | | 52/309.15 |
| 8,739,486 B2 * | 6/2014 | Bodsford et al. | 52/506.05 |
| 2011/0173913 A1 * | 7/2011 | Bodsford | E04H 5/10 |
| | | | 52/407.4 |
| 2011/0197530 A1 * | 8/2011 | Bahnmiller | 52/309.4 |
| 2013/0152498 A1 * | 6/2013 | Krause | E04F 13/0828 |
| | | | 52/235 |
| 2014/0137497 A1 * | 5/2014 | Bahnmiller | B32B 5/14 |
| | | | 52/309.4 |

OTHER PUBLICATIONS

Translation of Office Action issued in Japanese Patent Application No. 2014-503666 dated Sep. 24, 2015, 6 pages.
Translation of Office Action issued in Mexican Patent Application No. MXa2013011609 dated Aug. 28, 2015, 7 pages.
Translation of Office Action issued in Chinese Patent Application No. 201280022470.7 dated Mar. 26, 2015, 9 pages.
Chinese Patent Application 201280022470.7 Office Action dated Nov. 3, 2015, received Nov. 26, 2015, 9 pages.
Russian Patent Application 2013149275/03 Office Action dated Dec. 4, 2015, received Dec. 17, 2015, 8 pages.

* cited by examiner

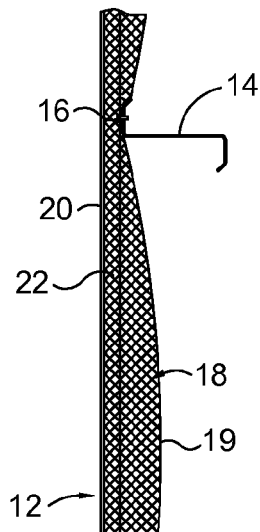
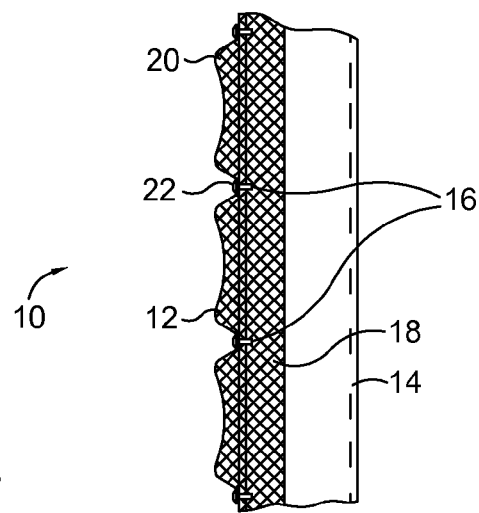
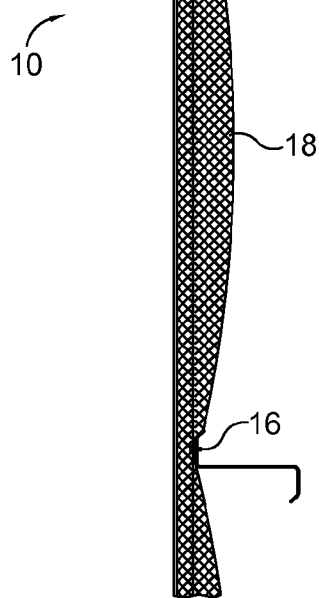
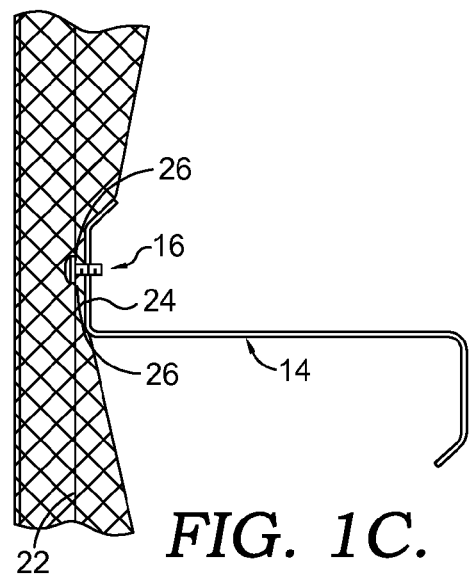
FIG. 1A. PRIOR ART
FIG. 1B. PRIOR ART
FIG. 1C. PRIOR ART

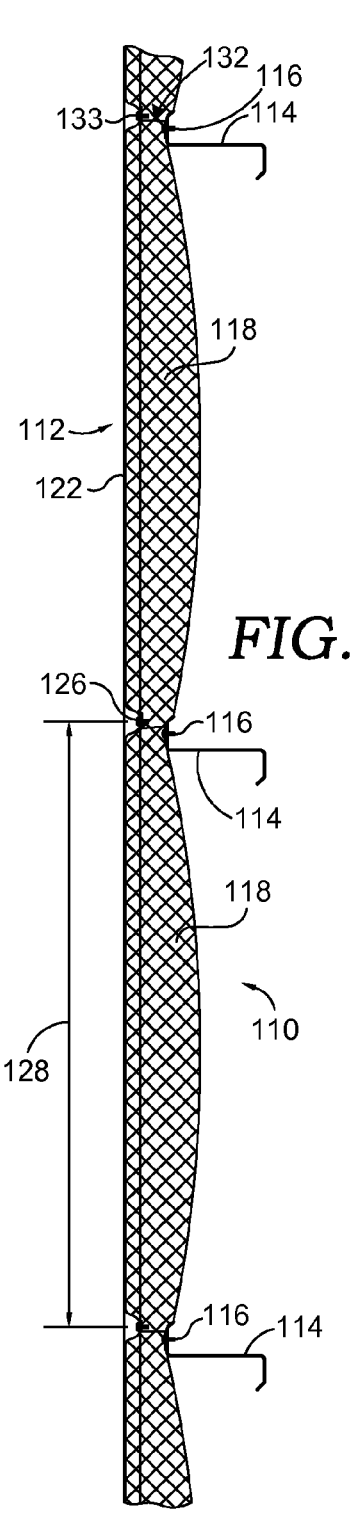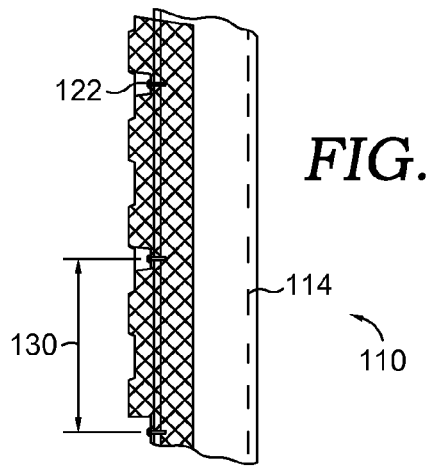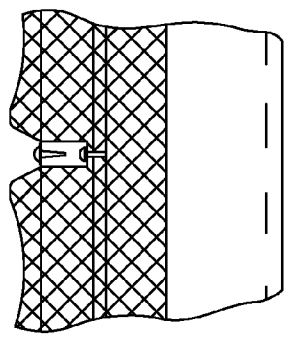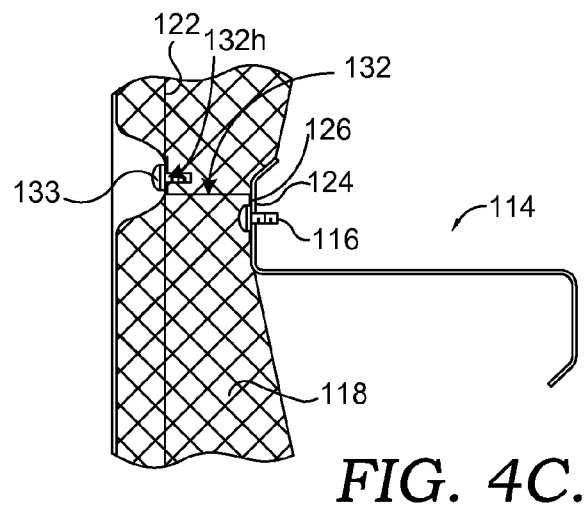

WALL INSULATION SYSTEMS AND STANCHION

CROSS-REFERENCE TO RELATED APPLICATIONS

This application claims the benefit of U.S. Provisional Application No. 61/472,400 filed Apr. 6, 2011, the entire contents of which are herein incorporated by reference.

BACKGROUND OF THE INVENTION

1. Field of the Invention

The invention relates generally to the field of constructing buildings. More specifically, the invention relates to the field of fabricating insulated metal walls for metal buildings.

2. Description of the Related Art

Conventionally, metal buildings are constructed according to a series of steps. First, a metal frame is constructed. The metal frame includes numerous structural support members. The roof portions include sloped roof structural members referred to as purlins. The walls include vertically spaced horizontally extending members, which are referred to as girts. Once the frame is installed, it is common to insulate both the roof and wall portions of the building.

With respect to roof arrangements, blanket insulation is draped over the tops of the purlins, and then roof panels are fastened over the insulation. In some cases, it has been known to install a longitudinal thermal block above the top flange of the purlin such that it runs the entire length of the purlin over the draped blanket insulation.

With respect to the conventional wall, blanket insulation is secured from above such that it is draped over horizontally extending girts. Then metal wall panels are fastened to the outer flanges of the girts, mashing the blanket insulation between the wall panel and the outer flange of each girt where they interface. These lines of mashed down insulation create heat losses.

SUMMARY

In embodiments, the invention is a wall system that is structurally supported by vertically displaced horizontal support members (e.g., girts). In embodiments, the system includes a wall panel of the kind having inwardly-extending channels. In a first embodiment a bracket is installed between the girts and wall panel. Each bracket has a plurality of tabs. The tabs are spaced apart from one another on the bracket, and extend laterally outward. Portions of each tab are configured to secure the bracket between the wall panel and the vertically displaced horizontal support member. In a second alternative embodiment, independent tabs (not on a bracket) can be spaced apart along each of the horizontal support members. Regardless, space is created between the outer flanges of the girts and inwardly-extending channels on the wall panel. This space allows a blanket of insulation to be expanded into space created between the tabs.

A method for fabricating a wall is also disclosed. The method includes (i) providing a plurality of vertically spaced, horizontally extending structural members, (ii) draping insulation outside of the horizontally extending structural members, (iii) fastening connector portions on laterally extending tabs on a plurality of bracket members over the blanket insulation into a plurality of outer flanges of each of the plurality of horizontally extending structural members, and (iv) installing a wall panel outside of the insulation by fastening the wall panel to an outer flange on the bracket.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 1A shows a cross-sectional wall section of a conventional insulated panel;

FIG. 1B shows a top view of a horizontal section taken from a conventional insulated metal building wall design;

FIG. 1C is a broken out section showing the specifics around a girt for the conventional design shown in FIGS. 1A and 1B;

FIG. 4A shows a vertical section taken from the insulated wall of the present invention;

FIG. 4B shows a horizontal section taken from the insulated wall of the present invention;

FIG. 4C shows a broken out section taken from the vertical section of FIG. 4A;

FIG. 4D shows a broken out section taken from the horizontal section taken from FIG. 4B;

DETAILED DESCRIPTION

Embodiments of the present invention provide an insulated metal panel system for insulating a building. To provide context for the disclosed embodiments, consider FIGS. 1A, 1B, 1C, and 1D which show the current state of the art.

Figure 1D:
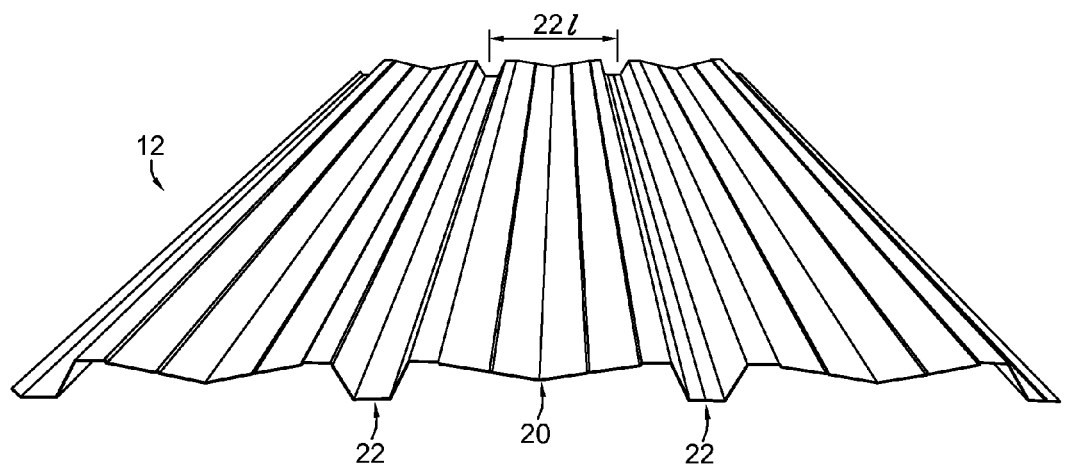
FIG. 1D is a perspective view of an exemplary wall panel.

FIG. 1A shows a conventional system 10 wherein a metal wall panel 12 is installed to create a building wall. The type of paneling shown in FIGS. 1A-D is referred to by the trade name SHADOWALL® and is manufactured by BlueScope Butler located in Kansas City, Mo., a business group of BlueScope Steel Limited, Australia. As shown in FIG. 1D, the wall panel 12 may include vertical channels (or ridges) 22 that run up and down the panel 12. These vertical channels 22 constitute the inner most part of the panel 12, i.e., these channels 22 extend towards the building interior the furthest (see FIG. 1B). Between each of these vertical channels 22 a subtle V-dip 20 also extends in the same direction as the channels (ridges) 22 (see FIG. 1D).

As shown in FIG. 1A, this type of metal panel 12 is commonly fastened to a plurality of horizontally running and vertically spaced Z-girts 14. Each Z-girt 14 has an outer flange 24 (see FIG. 1C) to which, using fasteners 16, the metal wall panel 12 is fastened. The fasteners 16 typically are self-tapping screws.

When it is desirable to insulate the wall, a blanket of insulation 18 may be unrolled and draped down the wall panel 12 before the panel 12 is secured to the Z-girts 14. The blanket of insulation 18 may have a facing 19 on the inside, which prevents contact with inhabitants, presents a more appealing look, and creates a vapor barrier. The draping process may involve tacking the blanket 18 in some manner to the uppermost purlin so that it remains in an unfurled position. After being unrolled and draped down the panel 12, the blanket of insulation 18 is secured between the wall panel 12 and the outer flanges 24 of the plurality of Z-girts 14 using the fasteners 16 (see FIG. 1A). More specifically, the fasteners 16 are driven through the vertical channels 22, the blanket of insulation 18, and then into the outer flanges 24 of the Z-girts 14.

When a fastener 16 is screwed through the inner most portion (channel 22) of the wall, it presses against the outer flange 24 of the corresponding Z-girt 14, and sandwiches a portion 26 of the blanket of insulation 18 (see FIG. 1C). This compacting of the blanket of insulation 18 creates an area where the thermal resistance is weakened, which allows for considerable heat losses. If one were to look at the heat flow diagrams in the area near the flange 24 of Z-girt 14, one would see significant flow of heat energy through the area surrounding the fastener 16. Conversely, one would note that the heat losses are reduced at locations spaced above or below the flanges 24 of the Z-girts 14. This reduction in heat loss at the inter-girt positions is because the blanket of insulation 18 (for example, halfway between the vertically spaced Z-girts 14 in FIG. 1A) billows and fluffs outward the further it is from the girt flanges 24, allowing for more air, which is a good insulator of heat, to aid in the insulation. As the blanket of insulation 18 is pinned between the inside surface of the channels 22 and the girt flange 24 at numerous locations in the panel 12, the resulting heat loss would appear as a plurality of vertically displaced parallel horizontal stripes on the outside of each wall of the building so configured.

Figure 2:
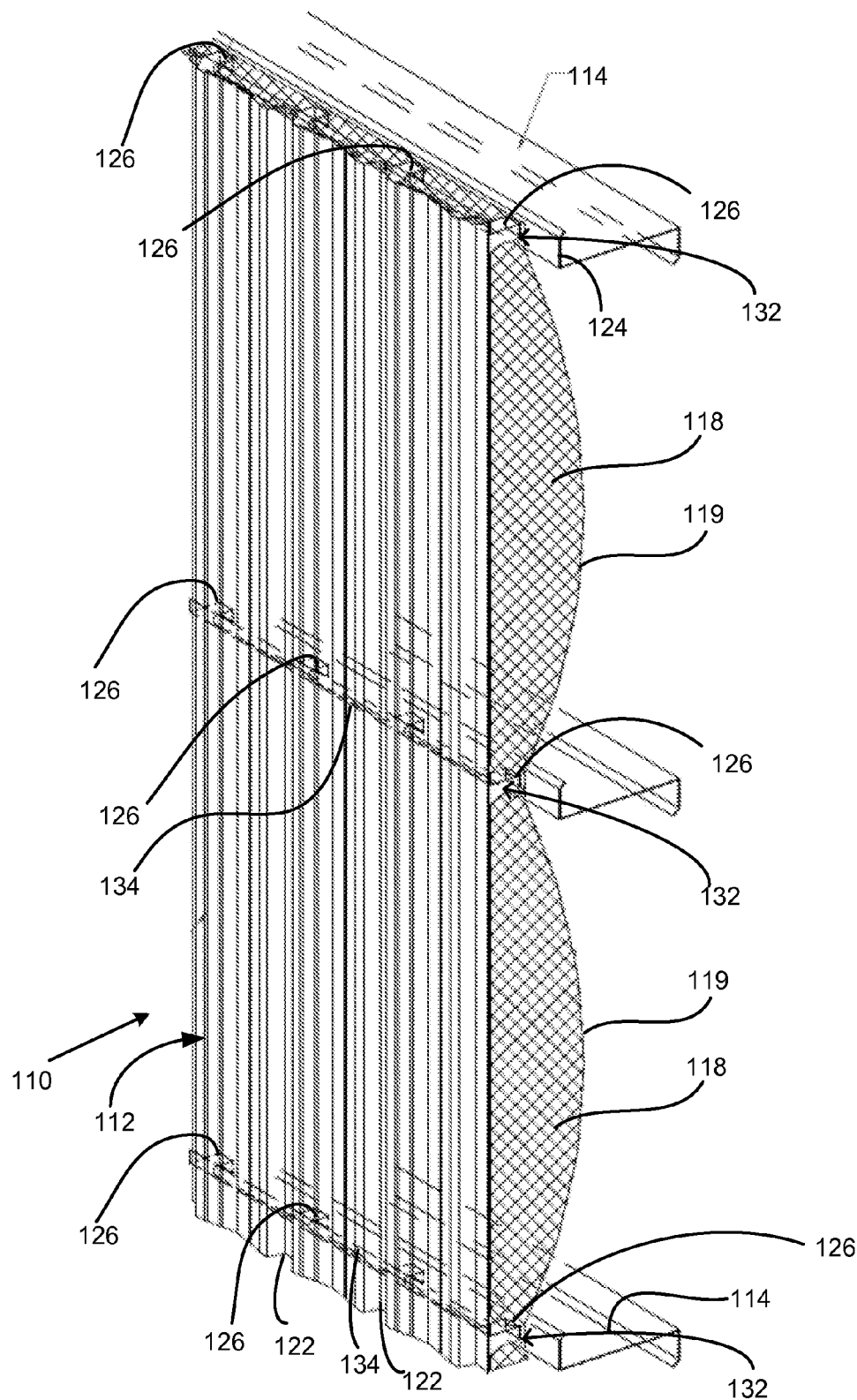
FIG. 2 shows a perspective view of an insulated wall according to the invention disclosed herein.

The arrangement disclosed by the current invention 110, which can be seen in FIGS. 2 through 5, greatly reduces heat losses in a metal wall 112 (see FIG. 2). As with the conventional system 10, the metal wall 112 is attached outside Z-girts 114 of the building using fasteners. Also, like the conventional system 10, when the wall 112 is mounted, a blanket of insulation 118 having a facing 119 is draped down and installed between the wall 112 and the Z-girt 114. Further, akin to the conventional system 10, the new system 112 is fastened at innermost channel portions 122 of the wall 112 (see FIG. 2).

But the new system 110 is different from the conventional system in that the blanket of insulation 118, upon securing the metal wall panel 112, is not directly pressed and sandwiched between the metal wall panel 112 and the flange 124 of the Z-girt 114. Instead, a laterally extending stanchion bracket 132 (see FIG. 2) is installed over the insulation 118 and is fastened between the wall panel 112 and outer flange 124 of the Z-girt 114 along the length of the girt 114.

Figure 3A:
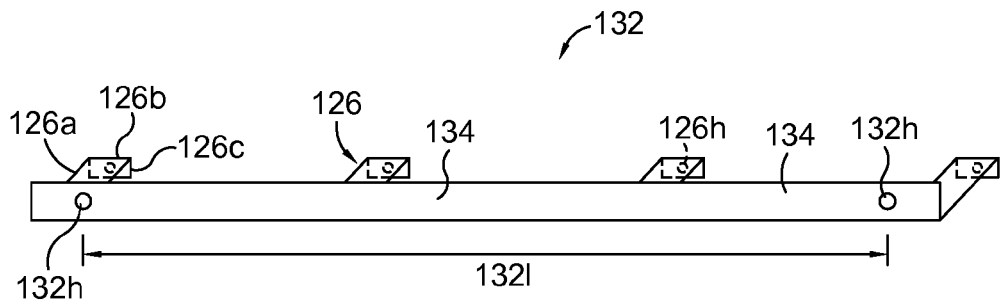
FIG. 3A is a perspective view of a stanchion bracket in line with the teachings of the present invention.
Figure 3B:
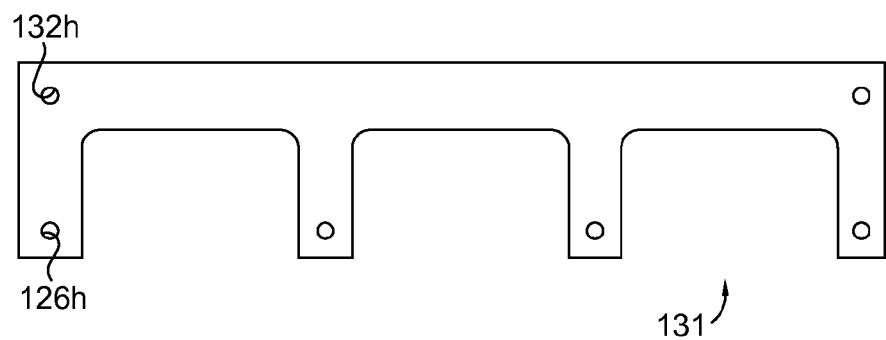
FIG. 3B shows a flat metallic piece that can be machined to make the stanchion bracket of FIG. 3A.
Figure 3C:
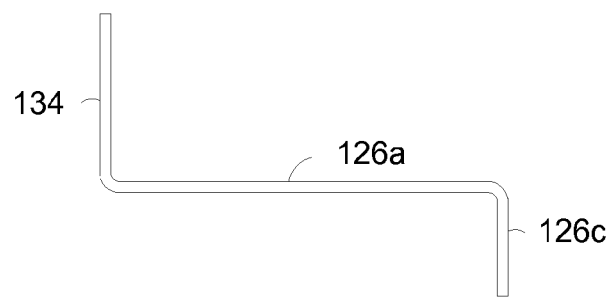
FIG. 3C shows an end view of the stanchion bracket of FIG. 3A.
Figure 5A:
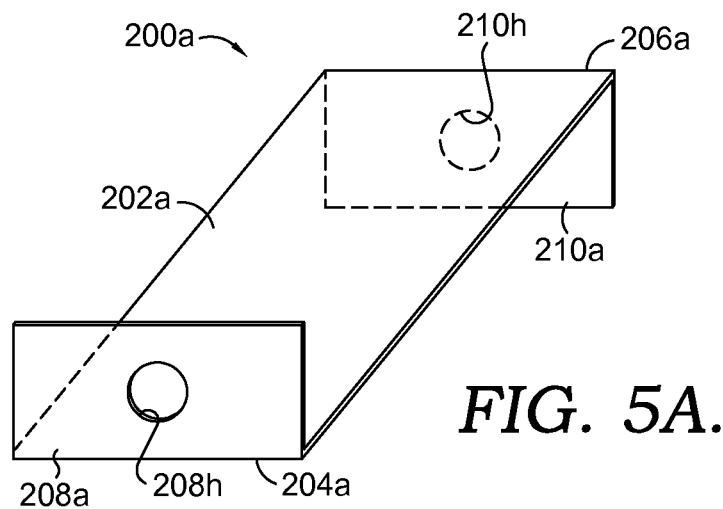
FIG. 5A shows a perspective view of a spacer tab in line with the teachings of the present invention.
Figure 5B:
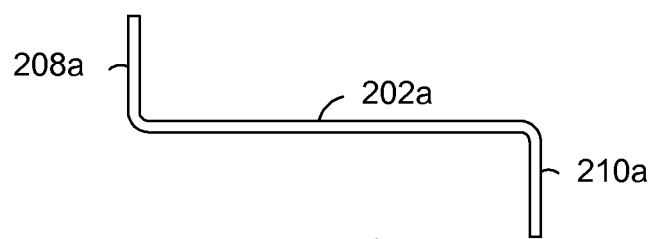
FIG. 5B shows an end view of the spacer tab of FIG. 5A.

The stanchion bracket 132, as shown more clearly in FIG. 3A, comprises a laterally extending support bar 134 and plurality of tabs 126 spaced along the length of the support bar 134. Each tab 126 has an outwardly extending portion 126a which extends outward from the support bar 134 and terminates at an edge 126b. The edge 126b of the outwardly extending portion 126a constitutes that part of the outwardly extending portion 126a which is furthest away from the support bar 134. Each tab 126 further comprises a downwardly extending portion 126c that extends downward from the edge 126b.

The stanchion bracket 132 may be constructed from a flat metallic piece 131 (see FIG. 3B) that is configured, by known methods, to form the finished stanchion bracket 132. Some or all of the tabs 126, within their downwardly extending portions 126c, may include openings or holes 126h. The support bar 134 may also have holes 132h that are laterally spaced along the support bar 134 at a distance 132l, which distance 132l generally corresponds to a lateral distance between two vertically extending adjacent channels 22 (see measurement 22l in FIG. 1D).

In terms of assembly in the erection of the building, the Z-girts 114 will already be in place as shown in the figures, and the remaining wall components will be installed outside them. In some embodiments, the blanket of insulation 118 will be draped over the outside of flanges 124 of the Z-girts 114. It is not necessary to independently fasten the insulation 118 at this point, but in many instances, it will make sense to secure the blanket 118 from above and allow it to drape down outside the girt flanges 124 before securing the wall panel 112 to the Z-girts 114.

The next step, in embodiments, involves securing the stanchion brackets 132. In some embodiments, this would mean that the tabs 126 of the stanchion bracket 132 are secured to the flange 124 of the Z-girt 114 on top of the insulation 118 before the wall panel 112 is secured to the support bar 134 of the bracket 132. After the tabs 126 are aligned and fixed such that they extend along the length of the Z-girt 114, fasteners 116 (see FIG. 4C) are passed through the holes 126h in the tabs 126 and the blanket of insulation 118, and made to bite into the flange 124 of the Z-girt 114. The portions of insulation trapped underneath the tabs 126 of the stanchion 132 are relatively small, and after they are secured to the girt flange 124, the surrounding insulation easily puffs outward to fill all the areas surrounding the tabs 126. Care may be taken to horizontally align the tabs 126 along the flange 124 in such a way that at least one channel 122 of the panel 112, when the panel 112 is subsequently installed, corresponds to a hole 132h in the support bar 134 of the bracket 132.

The next step, after the tabs 126 are secured to the flange 124 via fasteners 116, is to stand the panel 112 upright such one or more channel portions 122 of the panel 112 align with the hole 132h in the support bar 134 of the bracket 132. Specifically, fasteners 133 (see FIG. 4C) are passed through the channel 122 from the outside, and then passed through hole 132h in the support bar 134. The panel 112, thereby, is indirectly secured to the flange 124 of the Z-girt 114.

Because the outwardly extending portions 126a of the tabs 126 displace the panel 112 from the outer flange 124 of the Z-girt 114, significant open space is created between the girt 114 and the panel 112 so that the insulation 118 can fill the space. Moreover, each tab 126 is laterally spaced from an adjacent tab 126 by a distance 130 (see FIG. 4B), and a bracket 132 is vertically spaced from another bracket 132 by a considerable distance 128 (See FIG. 4A). These distances create more area for the blanket of insulation 118 to fluff out into, both between the vertically spaced Z-girts 114, and also into the lateral spaces 130 between adjacent tabs 126. Fluffed blanket insulation 118 is far more effective as a heat barrier than insulation 118 that is matted down. Thus, a much higher percentage of the wall panel 112 is backed by insulation that is billowed rather than matter down, and consequently, heat losses are greatly reduced because of the stanchion brackets 132.

It is also possible to achieve the objectives stated above by using, instead of or along with the stanchion bracket 132, a plurality of independent tabs 200a (see FIGS. 5 and 5B) that are laterally spaced along the length of the outer flange 124 of the Z-girt 114. In this embodiment, the tab 200a has a base member 202a having edges 204a and 206a. A connector portion 208a having an opening or hole 208h extends vertically upward from the edge 204a, whereas a connector portion 210a having an opening or hole 210a extends vertically downward from the edge 206a. The tabs 200a are first secured to the flange 124 of the Z-girt 114 over the insulation 118 by a fastener that extends through the hole 210h in the connector portion 210a, and then bites into the flange 124 of the Z-girt 114. As before, in terms of horizontal placement of the tabs 200a along the flange 124, care may taken that the tabs 200a are secured to the flange 124 in such a way that the holes 208h in the connector portion 208a correspond with channel portions 122. After the tabs 200a are secured to the flange 124, the panel 112 may be stood upright and secured to the connector portions 208a of the tabs 200a; specifically, a fastener may be passed, from the outside of the channel 122, through the channel 122 and the hole 208h of the connector 204a, thereby indirectly securing the panel 112 to the flange 124 of the Z-girt 114. These independent tabs 200a may allow for greater flexibility than the stanchion bracket 132, as any number of tabs 200a can be secured and spaced as desired in line the requirements of a particular project.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A wall system comprising:
   a plurality of horizontal support members;
   a wall panel having at least one inwardly-extending channel;
   a plurality of stanchion brackets disposed between the horizontal support members and the wall panel, and laterally spaced apart along each of the horizontal support members, wherein each stanchion bracket comprising a laterally extending support bar and a tab extending outwardly from the support bar, the support bar having at least one opening configured to secure the stanchion bracket to the wall panel, the tab having an opening that is offset from the at least one opening of the support bar and is configured to secure the stanchion bracket to a respective one of the horizontal support members;
   a blanket of insulation disposed over the horizontal support members, portions of which are compressed between the horizontal support members and the support bar of each of the stanchion brackets; and
   wherein the horizontal support members and the inwardly-extending channel are displaced with respect to each other by at least the length of the tab and wherein the length of the tab is sufficient to allow a thickness of the blanket of insulation to be compressed between the horizontal support members and the inwardly extending channel.

2. The wall system of claim 1 wherein each stanchion bracket includes additional tabs laterally spaced on and extending outwardly from the support bar.

3. The wall system of claim 2 wherein each horizontal support member includes an outer flange; and
   wherein for each stanchion bracket, each of the tab and additional tabs terminates in a downwardly extending portion to receive a fastener to attach the stanchion bracket to the outer flange of the horizontal support member.

4. The wall system of claim 1 wherein the support bar includes two openings that are laterally spaced at a distance which corresponds to a lateral distance between two inwardly-extending channels in the wall panel.

5. The wall system of claim 1 wherein each horizontal support member includes an outer flange; and
   wherein the tab of each stanchion bracket terminates in a downwardly extending portion to receive a fastener to attach the stanchion bracket to the outer flange of the horizontal support member.

6. The wall system of claim 1 wherein each horizontal support member is a girt.

7. A system for improving the thermal efficiency of the walls of a building, the system comprising:
   a plurality of vertically displaced horizontal support members, each member with an outer flange;
   a wall panel having at least one inwardly-extending channel;
   a plurality of stanchion brackets disposed between the outer flanges of the horizontal support members and the wall panel, wherein the stanchion brackets are laterally spaced apart along each of the horizontal support members;
   each stanchion bracket comprising a laterally extending support bar and a tab extending outwardly from the support bar, the support bar having at least one opening configured to secure the stanchion bracket to the wall panel, and the tab having an opening that is offset from the at least one opening of the support bar and is configured to secure the stanchion bracket to one of the horizontal support members;
   a blanket of insulation disposed over the plurality of horizontal support members, portions of which are compressed between the outer flanges of the horizontal support members and the support bar of the stanchion brackets; and
   wherein the horizontal support members and the inwardly-extending channel are displaced with respect to each other by at least the length of the tab, and wherein the length of the tab is sufficient to allow a thickness of the blanket of insulation to be compressed between the horizontal support members and the inwardly extending channel.

8. The system of claim 7 wherein portions of the blanket of insulation disposed between adjacent stanchion brackets remain in a relatively uncompressed state compared to the portions of the blanket of insulation disposed between the outer flanges of the horizontal support members and the tabs of the stanchion brackets.

9. A method of creating a wall, the method comprising:
   providing a horizontally extending structural member;
   providing a stanchion bracket comprising a laterally extending support bar and a tab extending outwardly from the support bar, the support bar and the tab each has an opening offset from one another, and the length of the tab is sufficient to allow a thickness of blanket insulation to be compressed between the horizontally extending structural member and the wall panel;

draping blanket insulation outside of the horizontally extending structural member;

fastening the stanchion bracket, over the blanket insulation, to the horizontally extending structural member using the tab opening; and installing a wall panel outside of the blanket insulation by fastening the wall panel to the stanchion bracket using the support bar opening.

10. The method of claim 9 wherein the draping further comprises tacking the blanket insulation to an uppermost horizontally extending structural member on the wall before installing the stanchion bracket.

* * * * *